Nov. 10, 1931.  A. H. MATLOWSKY  1,831,503
MECHANICAL RABBIT
Filed Jan. 4, 1930　　2 Sheets-Sheet 1
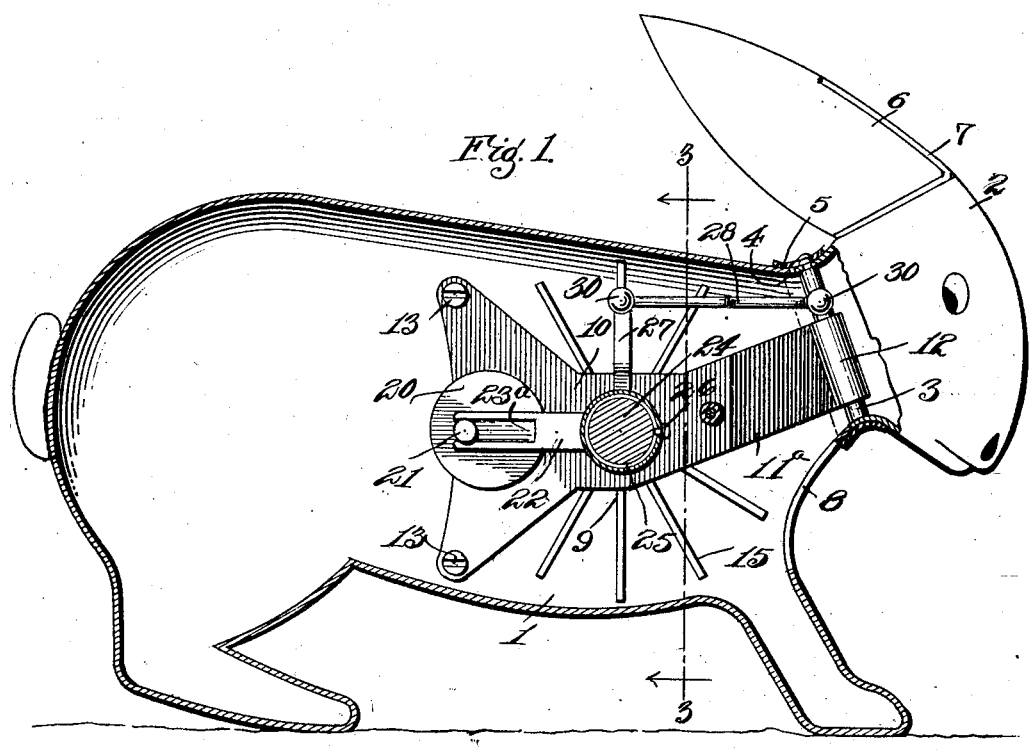
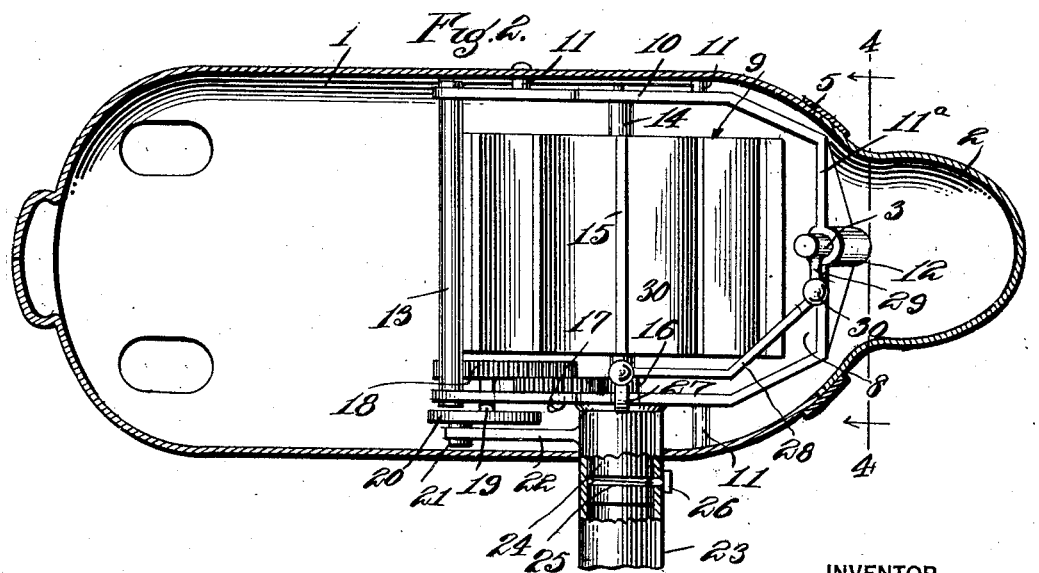
WITNESS
F. H. Sayler
INVENTOR
Abraham H. Matlowsky.
BY
ATTORNEY Nov. 10, 1931.   A. H. MATLOWSKY   1,831,503
MECHANICAL RABBIT
Filed Jan. 4, 1930   2 Sheets-Sheet 2

WITNESS
S. H. Saylor

INVENTOR
Abraham H. Matlowsky
BY
Munn & Co.
ATTORNEY

Patented Nov. 10, 1931

1,831,503

UNITED STATES PATENT OFFICE

ABRAHAM HERMAN MATLOWSKY, OF PEDRO MIGUEL, CANAL ZONE, PANAMA

MECHANICAL RABBIT

Application filed January 4, 1930. Serial No. 418,585.

This invention relates to dog racing apparatus, and it consists in the construction, arrangement and combination of the parts herein described and claimed.

In dog racing contests it is a usual practice to mount a lure on one end of a support, the other end of which is connected to a carrier means adapted to sweep the support and lure along a course at a high rate of speed.

An object of the invention is to provide a lure which will simulate the movements of a live animal and thus more readily attract the dogs entered in the contest.

A further object of the invention is to provide a mechanical lure wherein the movement of certain parts thereof is caused by wind pressure developed by movement of the lure along a race course.

A still further object is to provide an improved wind motor which may be readily incorporated within a mechanical rabbit or other lure, whereby such motor may be caused to operate movable elements of the lure.

Figure 3:
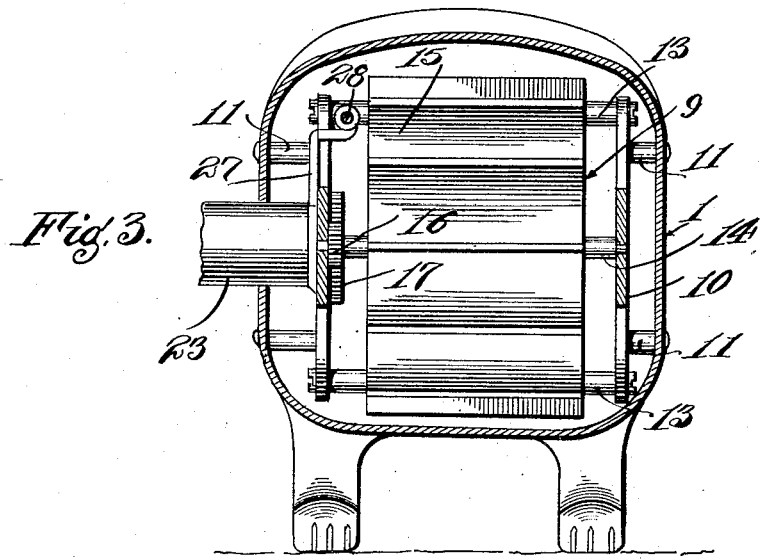
Figure 4:
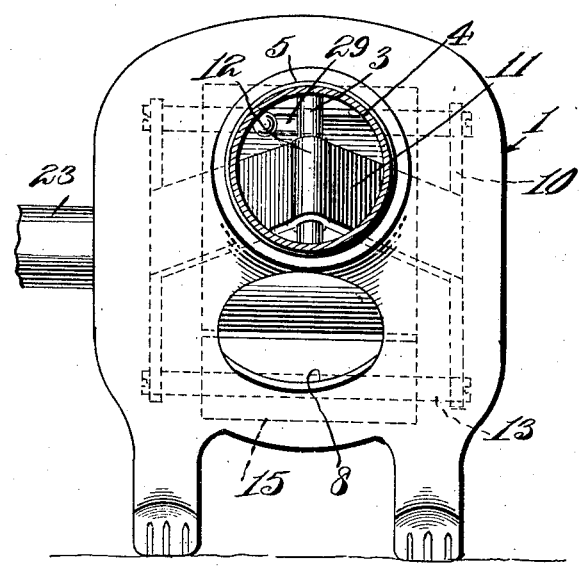
Figure 5:
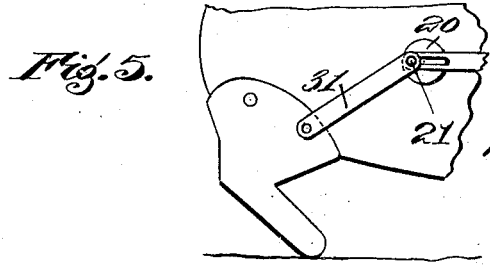

Additional objects, advantages and features of invention will be apparent from the following description and accompanying drawings wherein, Figure 1 is a longitudinal vertical sectional view of a mechanical rabbit constructed in accordance with my invention, Figure 2 is a longitudinal sectional view thereof, Figure 3 is a cross section on the line 3—3 of Fig. 1, Figure 4 is a cross section on the line 4—4 of Fig. 2, Figure 5 is a modified form of a leg mounting.

In carrying out my invention I provide a hollow lure 1, in the present instance being represented as a rabbit. The body of the lure may be formed from metal although celluloid or fibre may be equally well employed; and the body is preferably formed in half-sections in order that the interior mechanism may be readily installed. In order to give more realistic appearance to the lure, the body may be covered with fur or it may be suitably painted to represent the live animal which it is supposed to represent.

Upon the front end of the body 1 there is mounted a head 2 adapted to swing from side to side. The head 2 is hinged upon a pintle 3 and carried by the neck 4 of the body 1. A rubber collar 5 is secured to the head 2 and extends rearwardly a slight distance over the neck 4, in order to cover the joint between the head and neck.

The ears 6 of the head 4 are hingedly connected to the head, and in the present instance, this hinge is shown as an elastic insert 7 connected between the upper part of the head and the lower and front edge of the ears. Thus, the ears will be permitted to swing backwardly over the body during the movement of the lure through the air. Upon decreasing the speed of the lure, it will be apparent that the pressure around the ears 6 will be released and thus the ears 6 will tend to assume an erect position.

The lure 1 has an opening 8 at the front end, adapted to admit wind for operating a wind-wheel, as will be apparent, as the description proceeds.

Intermediate the length of the body 1 there is mounted a wind motor 9 which consists of a framing 10 secured by rivets 11 to the body 1.

The frame is substantially U-shaped in plan with its side members 10 extended along the sides of the lure and having its bight portion 11a presented toward the forward end thereof. The forward end of the frame has a bearing 12 through which the pintle 3 is journalled, while the rear ends are connected by transverse bars 13.

Supported between the side members 10 of the frame there is mounted a shaft 14 having a wind-wheel 15. The shaft 14 has a gear 16 keyed thereto adapted to mesh with gears 17 and 18 carried upon one of the side members 10. The gear 18 has a stud shaft 19 extending through the side member upon which there is mounted a crank 20 having a wrist pin 21. A rigid arm 22 is carried by the mounting bracket 23, as clearly shown in Fig. 2. The arm 22 is bifurcated as at 23a to receive the wrist pin 21 therewithin, (see Fig. 1).

The side member 10 carrying the gearing has a stud shaft 24 revolubly mounted within the supporting bracket 23. The stud shaft 24 may be secured to the supporting bracket in any approved manner, but in the present instance the shaft is shown as having a circumferential groove 25, and a set screw 26 engaged through the bracket 23 and adapted to rest within the groove 25. By this construction, it will be apparent that the frame will be permitted to rock freely, as will now be explained.

An upright lever or arm 27 is also carried by the mounting bracket 23, to which there is suitably connected at its upper end, a link 28. The link 28 is extended forwardly in the direction of the head of the lure for connection with an arm 29 carried by the pintle 3. The connection between the arms 27 and 29 may be a ball and socket construction as shown at 30.

It will be readily apparent that the leg elements of the lure may be hingedly connected to the body, and operated through links 31 pivoted upon the wrist pin 21, to further simulate motion, one embodiment thereof being shown in Fig. 5.

The bracket 23 is movably supported by any suitable means (not shown) connected thereto, and as the bracket 23 is moved along it will be apparent that the lure 1 will be likewise moved.

In the operation of my device the supporting bracket 23 is suitably connected to a moving member adapted to sweep the lure along a course at high rate of speed. As the lure is so propelled, wind pressure thus developed, will enter the opening 8 at the front of the lure body. Such wind pressure strikes the wind-wheel 15, causing it to rotate. Motion will be transmitted to the crank 20 by virtue of the gears 16, 17 and 18, which in turn rocks the framing 10. As the frame rocks it will be apparent that the lure body 1 also rocks and the head 2 will be oscillated from side to side through the link connection 27, 28 and 29.

I claim:

1. In a dog racing apparatus, a track, a lure movable thereon, said lure being of hollow formation and having a wind wheel rotatably mounted therein, means for admitting wind pressure to said wind wheel, means for rocking said lure upon rotation of said wind wheel, and means for moving said lure.

2. In a dog racing apparatus, a track, a lure movable thereon, said lure being of hollow formation and having a swingable head, a wind wheel rotatably mounted within said lure, means to admit wind pressure to said wind wheel, means to rock said lure in a forward and backward direction, means to swing said head upon rotation of said wind wheel, and means to move said lure.

3. An animated lure comprising a hollow body having an opening at its forward end, a revoluble wind wheel mounted therein, means for rapidly moving said lure through the air for causing rotation of said wind wheel and means for rocking said body upon rotation of said wind wheel.

4. An animated lure comprising a support, a hollow body carried thereby, said body having an opening at its forward end, a frame mounted within said body, a wind wheel revolubly mounted within said frame and in the path of said opening, a gear train carried by said frame and operable through said wind wheel, a crank carried by one of the gears of said gear train, a fixed arm carried by said support and engaging said crank to cause rocking of said frame and lure upon rotation of said cam, and means to move said support and lure through the air whereby to develop wind pressure to rotate said wind wheel.

5. An animated lure comprising a support, a hollow body rockably carried thereby, a hingedly connected head member thereon, said body having an opening at its forward end, a frame mounted within said body, a wind-wheel revolubly mounted within said frame and in the path of said opening, a gear train carried by said frame and operable by said wind-wheel, a crank carried by one of the gears of said gear train and having a laterally extending pin, a bifurcated arm carried by said support and engaging said pin to cause rocking of said frame and lure upon rotation of said cam, an operating arm connected to said frame, a crank carried by said head member, a link connecting said operating arm and said last named crank, and means to move said support and lure through the air to develop wind pressure to rotate said wind-wheel.

6. In a dog racing apparatus, a track, a lure movable thereon, said lure having a wind wheel rotatably mounted therein, means for moving said lure, and means for rocking said lure upon rotation of said wind wheel.

ABRAHAM HERMAN MATLOWSKY.